Aug. 14, 1923.
H. F. HARDIN
1,464,761
BRAKE OPERATING DEVICE
Filed April 26, 1921
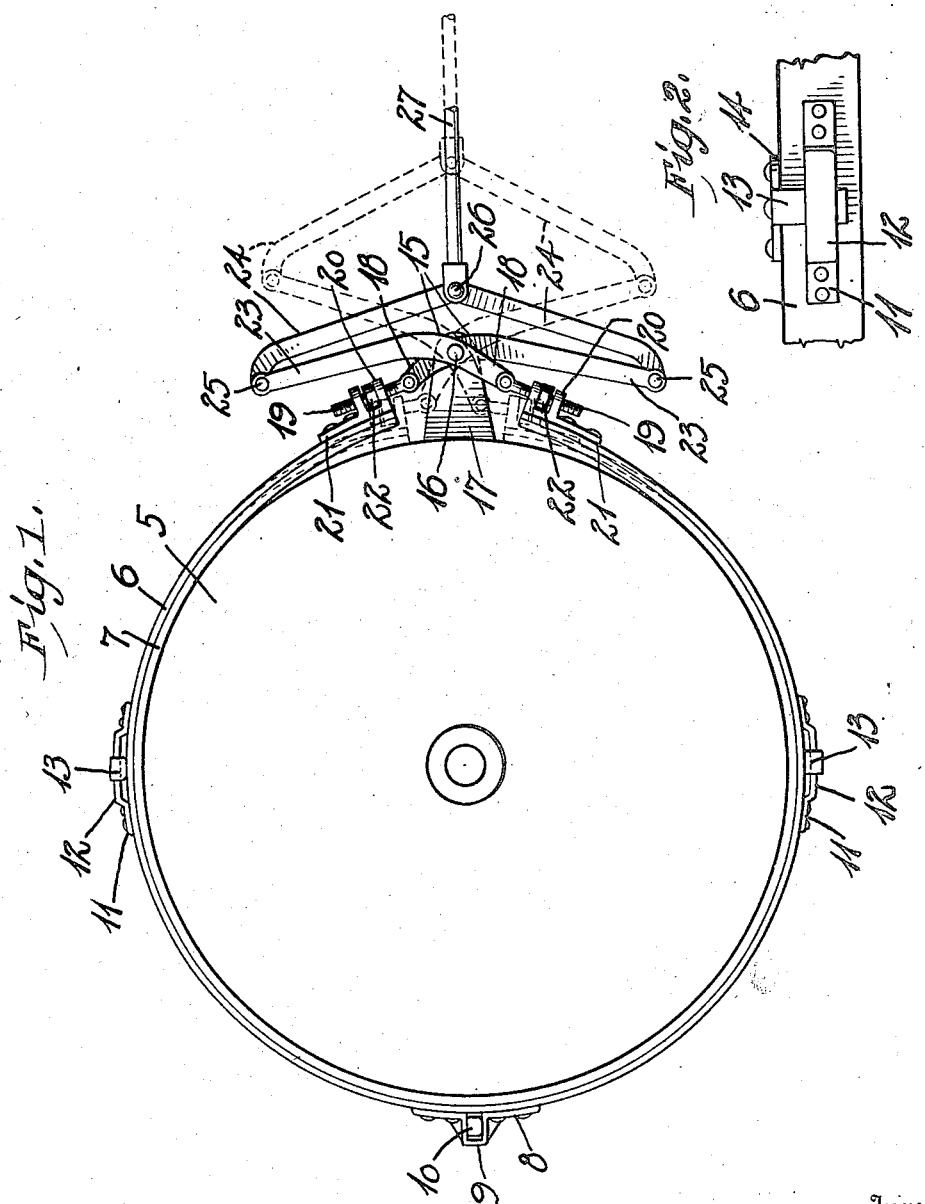
Inventor
H. F. Hardin,
By W. T. FitzGerald & Co.
Attorney Patented Aug. 14, 1923.

1,464,761

UNITED STATES PATENT OFFICE.

HOMER F. HARDIN, OF HOULTON, OREGON, ASSIGNOR TO HARDIN MFG. COMPANY, OF KALAMA, WASHINGTON, A CORPORATION.

BRAKE-OPERATING DEVICE.

Application filed April 26, 1921. Serial No. 464,552.

*To all whom it may concern:*

Be it known that I, HOMER F. HARDIN, a citizen of the United States, residing at Houlton, in the county of Columbia and State of Oregon, have invented certain new and useful Improvements in Brake-Operating Devices; and I do hereby declare the following to be a full, clear, and exact description of the invention, such as will enable others skilled in the art to which it appertains to make and use the same.

The present invention relates generally to brakes, and more especially to operating devices for brake bands, it being the object of the invention to provide a novel and improved double lever or toggle device for operating the brake band in an efficient manner and with considerable power.

Another object is the provision of such a double lever or toggle device of novel form and so mounted and connected to the ends of the brake band as to obtain a compact relation of the parts when the brake is released, and to also obtain a powerful grip when the brake is applied.

With the foregoing and other objects in view, which will be understood as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein:—

Figure 1 is a side elevation of a brake drum and band showing the improved operating device applied.

Fig. 2 is a detail plan view of one of the retaining means for the brake band.

In the drawing, there is shown a brake drum 5 surrounded by the flexible brake band 6 which has the friction lining 7 to grip the periphery of the brake drum. A retaining piece 8 is secured to the brake band intermediate its ends and has an offset portion 9 to receive an anchor lug or finger 10 to prevent the rotation of the brake band, and to anchor the intermediate portion thereof in place. The brake band is also slidably anchored between the intermediate portion and ends by means of retaining pieces or straps 11 secured to the band at such points and having offset portions 12 receiving retaining fingers 13 projecting from plates 14 which are secured to a non-rotatable supporting member. The straps 11 are slidable on the fingers 13 when the brake band is expanded and contracted, and said fingers in engaging the straps 11 will retain the band in place on the drum.

Coming to the operating device, it includes a pair of crossed levers 15 pivoted at their point of crossing, as at 16, to a supporting bracket or arm 17 substantially between the ends of the brake band. The levers 15 have the short arms 18 projecting toward the ends of the brake band, and pivotally connected to adjusting screws or stems 19 which are slidable through pairs of ears 20 outstanding from plates or pieces 21 secured on the end portions of the brake band, and adjusting nuts 22 are threaded on said stems and are located between the ears 20, whereby said nuts can be adjusted for contracting the brake band, from time to time, in order to take up the wear of the lining 7.

The levers 15 have the long arms 23, and the levers are curved or bent near the pivot 16, so that the long and short arms are arranged at obtuse angles with one another, so that when the arms 18 are separated for expanding the brake band, the arms 23 are swung close adjacent to the ends of the brake band, as seen in full lines in Fig. 1, to provide a compact arrangement of the device in its normal position.

A pair of toggle links 24 are pivoted at their opposite ends, as at 25, to the ends of the arms 23, and their adjacent ends are pivoted, as at 26, to an operating rod 27 which is reciprocated by an operating lever, pedal, or the like (not shown).

Under normal conditions, when the brake is released, the rod 27 is shoved toward the brake drum 5, whereby the links 24 swing the arms 23 toward the drum, thereby separating the arms 18 and ends of the brake band, so as to expand said band and release the drum 5. In this position of the parts, as seen in full lines in Fig. 1, the arms 23 of the double lever toggle device are positioned close to the end portions of the brake band, with the links 24 arranged adjacent to said arms 23, and said arms 23 and links 24 diverge in the direction of the brake drum. In this position of the levers, the long arms thereof are moved to or slightly beyond a line intersecting the pivot 16 at right angles to the radius line of the brake band and drum which intersects said pivot. To apply the brake, the rod 27 is pulled away from the brake drum, whereby the links 24 pull the arms 23 away from the brake band and drum, to swing the arms 18 toward one another and pull the ends of the brake band toward one another, thereby contracting the brake band on the drum. Owing to the toggle action and the leverage obtained, the brake band will be contracted with considerable force to obtain an effective grip on the brake drum, and due to the shape of the levers 15, maximum power is obtained by the swinging of the arms 23 away from the drum past a position of the arms in alinement with one another.

The brake mechanism is adapted especially for use on automobiles and other motor vehicles, but can be used generally, however, wherever brake drums are employed.

Having thus described the invention, what is claimed as new is:—

1. A brake operating device including in combination with a brake band, a bracket rigidly supported between the ends of the band, a pair of levers crossing one another and pivoted at the point of crossing to said bracket substantially between the ends of said band, said levers having short arms projecting toward the ends of the band and operatively connected thereto, and having long arms, and operating means connected to said long arms of the levers for swinging the short arms toward one another.

2. A brake operating device including in combination with a brake band, a bracket, a pair of levers crossing one another and pivoted at the point of crossing to said bracket substantially between the ends of said band, said levers having short arms projecting toward the ends of the band and operatively connected thereto, and having long arms, an operating rod, and toggle links connecting said long arms and rod.

3. A brake operating device including in combination with a brake band, a bracket, a pair of crossed levers pivoted at their point of crossing to said bracket having short arms projecting toward the ends of the brake band, said levers having long arms, an operating rod, toggle links connecting said long arms and rod, and connections between said short arms and end portions of said band, one of said connections including a member pivoted to the corresponding short arm and having a screw connection with the corresponding end portion of the band.

4. A brake operating device including in combination with a brake band, a pair of crossed and pivoted levers having short arms projecting toward and pivotally connected with the end portions of said band, said levers having long arms arranged at obtuse angles with the short arms to move close adjacent to the end portions of the band to or beyond a line intersecting said pivot at right angles to the radius line of the brake band which intersects the pivot, an operating rod, and toggle links connecting said long arms and rod and movable adjacent to said long arms when the short arms are separated.

5. A brake operating device including in combination with a brake band, a bracket, a pair of crossed levers pivoted at their point of crossing to said bracket substantially between the ends of said band, said levers having short arms projecting toward and pivotally connected with the end portions of said band, and having long arms arranged at obtuse angles with the short arms to move adjacent to the end portions of the band when the short arms are separated to or beyond a line intersecting said pivot at right angles to the radius line of the brake band which intersects the pivot, an operating rod, and toggle links connecting the long arms and rod to move adjacent to said long arms when the short arms are separated.

In testimony whereof I have signed my name to this specification in the presence of two subscribing witnesses.

HOMER F. HARDIN.

Witnesses:
H. J. SOUTHARD,
T. S. WHITE.